(No Model.)  2 Sheets—Sheet 1.

C. B. WANAMAKER.
WEIGHING SCALES.

No. 439,216. Patented Oct. 28, 1890.

WITNESSES.
F. Dean Rhodes.
James Walsh.

INVENTOR.
Charles B. Wanamaker,
per C. & E. W. Bradford,
ATTORNEYS.

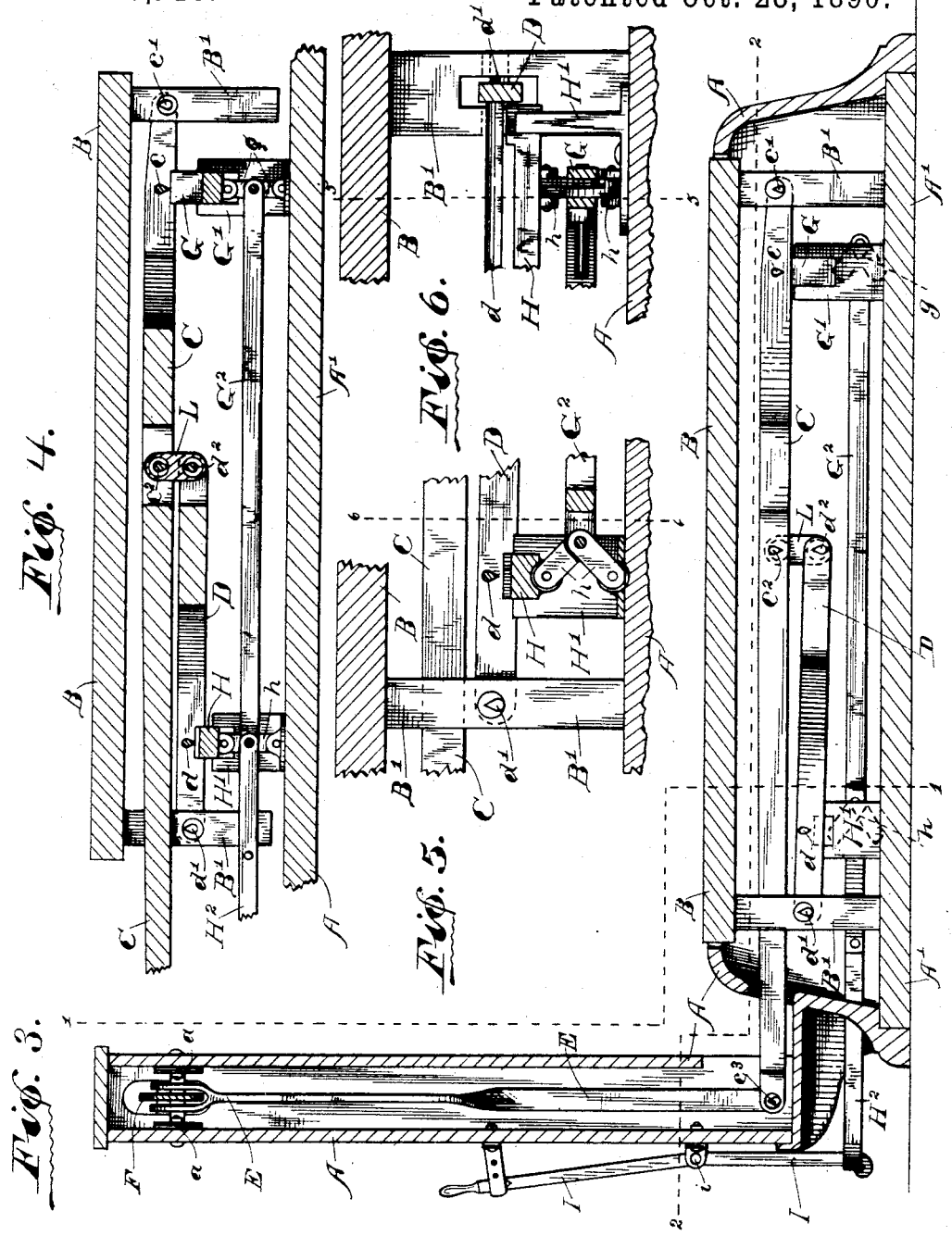

United States Patent Office.

CHARLES B. WANAMAKER, OF INDIANAPOLIS, INDIANA, ASSIGNOR TO THE WANAMAKER CAR SCALE COMPANY, OF SAME PLACE.

WEIGHING-SCALES.

SPECIFICATION forming part of Letters Patent No. 439,216, dated October 28, 1890.

Application filed February 3, 1890. Serial No. 339,098. (No model.)

*To all whom it may concern:*

Be it known that I, CHARLES B. WANAMAKER, a citizen of the United States, residing at Indianapolis, in the county of Marion and State of Indiana, have invented certain new and useful Improvements in Weighing-Scales, of which the following is a specification.

As is well known scales are frequently used in places where there is a continual vibration of the parts and a consequent wearing of the knife-edges or bearing-points. Among the most conspicuous instances which may be mentioned are railway-track scales and hay-scales, while almost all scales are subject to some extent to this disadvantage when the load is being placed thereon. Obviously, then, the knife-edges or bearing-points become dulled and the delicacy of movement and accuracy of result consequently impaired much sooner than if the jar and vibrations were received by other and less delicate parts.

The object of my said invention therefore is to produce a scale in which when the scale is out of use all the knife-edges or bearing-points therein shall be out of contact and thus free from wear.

Said invention will first be fully described, and then pointed out in the claims.

Figure 1:
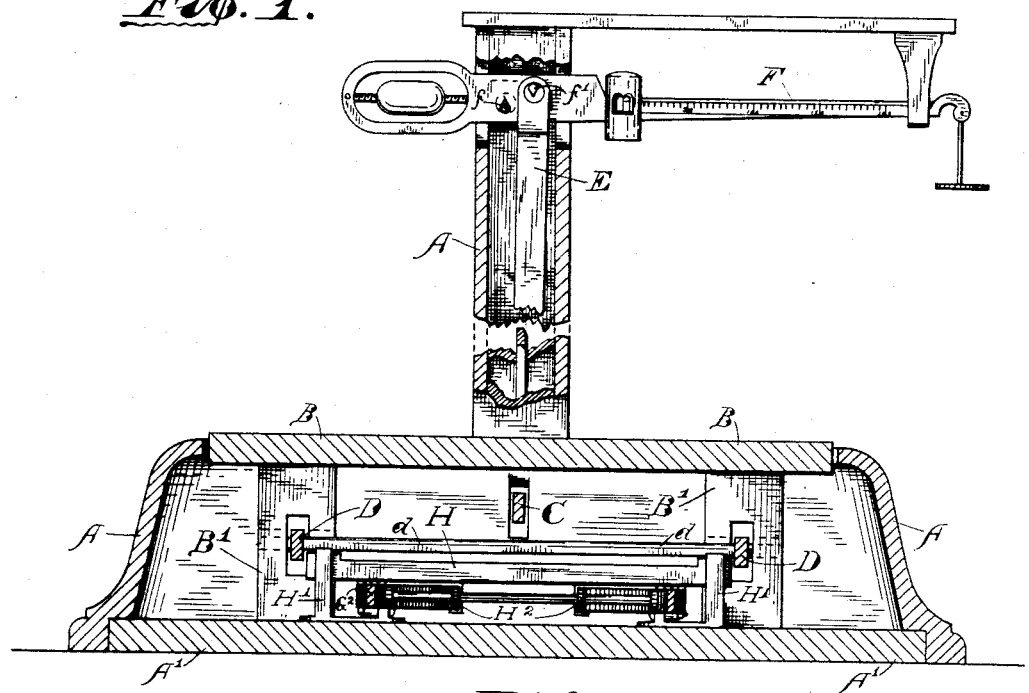
Figure 2:
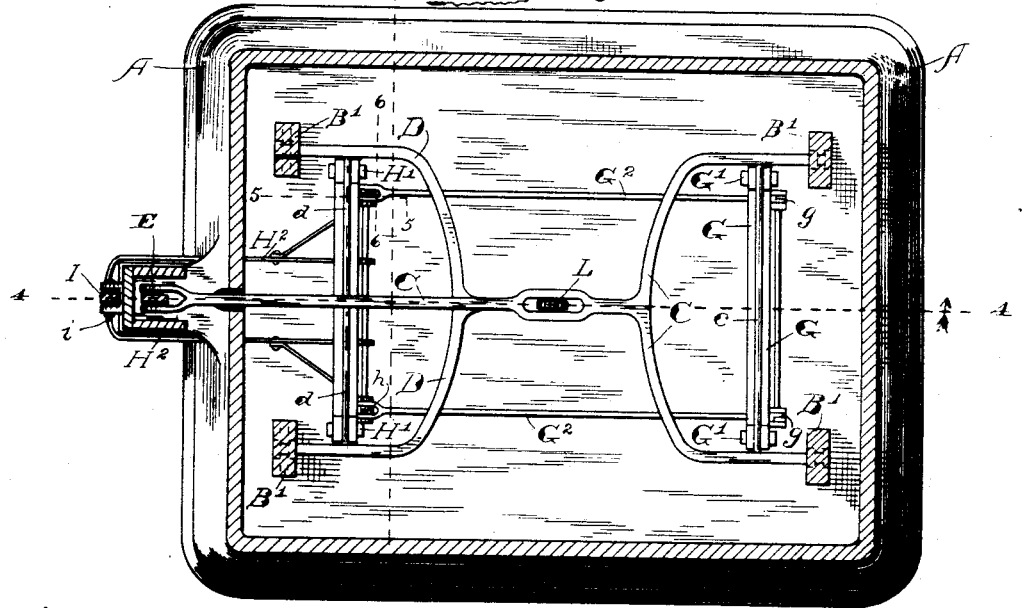

Referring to the accompanying drawings, which are made a part hereof, and on which similar letters of reference indicate similar parts, Figure 1 is a transverse vertical sectional view looking toward the left from the dotted lines 1 1 in Figs. 2 and 3; Fig. 2, a horizontal sectional view looking downwardly from the dotted line 2 2 in Fig. 3; Fig. 3, a side elevation of the mechanism of the scale, the casing being shown in section, so that the mechanism may be seen; Fig. 4, a central vertical sectional view looking upwardly in the direction of the arrows from the dotted line 4 4 in Fig. 2; Fig. 5, a detail sectional view, on a somewhat enlarged scale, as seen from the dotted lines 5 5 in Figs. 2 and 6; and Fig. 6 a detail sectional view as seen from the dotted line 6 6 in Figs. 2 and 5.

In Fig. 4 the mechanism is shown with the knife-edges or bearing-points in contact as when the scale is in use, but in the other figures the positions of these parts is that which they occupy when the scale is not in use.

In said drawings the portions marked A represent the casing or frame-work of the scale; B, the platform; C and D, the scale-levers; E, the connecting bar or rod; F, the scale-beam; G and H, bearings by which the scale-levers are supported when the scale is in operation, and I a hand-lever by which said bearings may be thrown into operative position.

The casing A is or may be substantially the same as the casing for the platform and mechanism for an ordinary scale. It of course is varied in construction, according to the character of the scale with which it is to be used. The platform B is similar, and is similarly arranged, to ordinary scale-platforms, except that it is provided with legs B', which preferably extend down to near the floor A' of the casing A when the scale is in operation, and are adapted to rest on said floor and support the platform when the scale is not in operation. The former position is shown in Fig. 4, while the latter is shown in the other figures. There are holes in these legs through which the knife-edges c' d' pass, and by means of these knife-edges and holes or other suitable bearings the scale-levers are enabled to lift said platform when the scale is thrown into position. Any other suitable supports may of course be provided instead of the floor A'.

The scale-levers C and D are in many respects similar to ordinary scale-levers. Their knife-edges $c$, $d$, $c'$, $d'$, $c^2$, $d^2$, and $c^3$ are, however, reversed from the position such knife-edges ordinarily occupy, and thus, when the scale is out of operation, they rest upon their backs instead of their edges, and the purpose of my invention is thus accomplished, as will be presently more fully described. They are connected at a central point by a link or bar L. The rod or bar E connects the free end of the scale-lever C and the scale-beam F. This occupies the same position in the scale as is ordinarily occupied by a corresponding rod, and bears the same relation to the other mechanism. It is, however, a stiff rod or bar, and operates under compression or a pushing strain instead of tension or a pulling strain, which latter is the common arrangement. The scale-beam F is also substantially an ordinary scale-beam, except that the knife-edges $f$ $f'$ are reversed from their ordinary position, (relatively to their bearings,) as is the case with those on the other parts. The ends of the knife-edge $f'$ enter holes in bearing-plates $a$ in the sides of the upright portion of the frame A.

The bearings G and H are shown as located near the bottom of the scale underneath the knife-edges or bearing-points $c\ d$. They are shown as resting in ways G' H', by which they are guided to have a vertical movement. These bearings may be operated by any means desired. Toggle-levers $g$ and $h$ are shown as the means and serve this purpose acceptably. Said toggle-levers are connected to the hand-lever I by rods $H^2$ and to each other by rods $G^2$, and are operated thereby, as will be readily understood. These bearings are located intermediate the points where the scale-levers engage with the scale-platform and the point where they are connected together.

The hand-lever I is shown as pivoted to the frame-work A upon a pivot $i$ in ears on said frame-work. At its lower end it engages with the rod $H^2$, which connects it to the toggle-levers $h$, and thence by means of the rods $G^2$ to the toggle-levers $g$.

The operation is, when it is desired to use the scale, that this hand-lever is forced inwardly, so that its upper end approximates a parallel relation to the standard portion of the frame A, which pulls the toggle-levers from the bent position shown most plainly in Figs. 3 and 5 to the straight position shown in Fig. 4, and causes said toggle-levers to raise the bearings G H against the knife-edges $c$ and $d$, carrying up the scale-levers C and D, which in turn through the knife-edges $c'$ and $d'$ raise the platform B through the legs B', which are raised from their contact with the floor of the scale-casing. When this is done, the scale is ready for use.

I do not wish to confine myself to toggle-levers as the means for raising the bearings, nor to any particular mechanism for raising said bearings, for there are many well-known mechanical devices which will answer the purpose, and I do not desire to be restricted in my selection of such devices. I have shown in my application, Serial No. 336,155, filed January 7, 1890, a hydraulic jack as such means, which, as well as all other equivalent devices, I regard as within the scope of my present invention.

When it is desired to throw the scale out of operative condition, it is only necessary to release the lever I and permit the toggles to bend or other equivalent devices to descend, when the bearings G and H will drop away from the knife-edges $c$ and $d$, thereby allowing the legs E' to drop onto and rest on the floor of the casing, (or the platform to reach other provided supports,) and the other knife-edges also to drop out of contact, which relieves said knife-edges or bearing-points from all wearing-contact until the scale is again thrown into operative condition.

Having thus fully described my said invention, what I claim as new, and desire to secure to secure by Letters Patent, is—

1. The combination, in a scale, of a platform having supporting legs or points extending nearly to a rest when the scale is in operative condition, the scale-levers, appropriate knife-edges, and bearings adapted to be raised against certain of said knife-edges and raise said levers and lift the platform off its rest into operative condition, and means for raising and lowering said bearings, whereby the bearing-edges of the knife-edges are wholly freed from contact when the scale is out of operative condition.

2. The combination, in a scale, of the platform, the scale-levers, the scale-beam, knife-edges on said scale-levers and scale-beam, the operative bearing-edges of which are reversed from the usual position, connecting links or bars between said scale-levers and between one of said levers and said beam, and lifting-bearings whereby the scale is thrown into operative condition, substantially as shown and described.

3. The combination, in a scale, of the scale-beam, the scale-levers, knife-edges thereto, connecting bars or links, a scale-platform provided with supports independent from the scale mechanism, independent rests for said scale mechanism, and vertically-movable bearings adapted in their upward course to first raise the scale mechanism into engagement with the platform, and then through said scale mechanism raise said platform off its independent supports, substantially as and for the purpose set forth.

4. The combination, in a scale, of the platform, the scale-levers, the scale-beam, the knife-edges, connecting bars or links, bearings adapted to be raised against certain of the knife-edges, and a toggle mechanism, whereby said bearings may be raised, substantially as set forth.

5. The combination, in a scale, of the scale-beam, the scale-levers, knife-edges thereto, connecting-bars or links, the scale-platform, bearings located between the points where the scale-levers engage with said scale-platform and the point where they are connected together, and mechanism by which said bearings can be forced up against said knife-edges on said scale-beams, substantially as set forth.

6. The combination, in a scale, of a platform for the load adapted to be supported by points of rest or by the scale mechanism, knife-edges on the scale-levers intermediate the points where they engage with said platform and the point where they are connected together, and bearings adapted to be raised against said knife-edges, and thus raise said platform from its point of rest and support it by the scale mechanism, substantially as set forth.

7. The combination, in a scale, of the platform, bearings or projections adapted to support said platform, a scale mechanism located below said platform and engaging therewith by means of knife-edges, other knife-edges in said scale mechanism, vertically-movable bearings adapted to come in contact with said last-mentioned knife-edges, and mechanism by which said vertically-movable bearings may be lifted, said scale mechanism thus thrown into operation and into engagement with the platform, which is also thus thereby lifted, substantially as set forth.

8. The combination, in a scale, of a platform having downward projections embodying the bearings for the knife-edges, the scale-levers having knife-edges which enter said bearings, the bearing-edges whereof are presented upwardly, and other knife-edges at a central point, the bearing-edges to which face toward each other, and a link forming bearings for said last-mentioned knife-edges and connecting them and other knife-edges, the bearing-edges of which are presented downwardly, located intermediate of the knife-edges which support the platform and the link by which they are connected together, and vertically-moving bearings adapted to engage with said last-mentioned knife-edges, whereby when said bearings are lifted the scale mechanism is thrown into operation, and the platform also lifted, and whereby when said bearings are depressed the scale mechanism is thrown out of operation and the knife-edges are permitted to rest on their backs, relieving their bearing-edges from contact, substantially as set forth.

9. The combination, in a scale, of the platform, the scale mechanism, vertically-moving bearings, whereby said scale mechanism is operated, the scale-beam, and a stiff rod connecting said scale mechanism and said scale-beam, whereby all the parts are pushed into operation when said points are lifted, substantially as shown and described.

In witness whereof I have hereunto set my hand and seal, at Indianapolis, Indiana, this 27th day of January, 1890.

CHAS. B. WANAMAKER. [L. S.]

Witnesses:
CHESTER BRADFORD,
JAMES WALSH.